US012624197B2

(12) United States Patent
Schwaiger et al.

(10) Patent No.: US 12,624,197 B2
(45) Date of Patent: May 12, 2026

---

(54) RUBBER COMPOSITION FOR AN INNER LINER FOR PNEUMATIC VEHICLE TYRES

(71) Applicant: Suncoal Industries GmbH, Ludwigsfelde (DE)

(72) Inventors: Bernhard Schwaiger, Erftstadt (DE); Tobias Wittmann, Berlin (DE); Jacob Podschun, Berlin (DE); Alexander Stücker, Hamburg (DE)

(73) Assignee: Suncoal Industries GmbH, Ludwigsfelde (DE)

(*) Notice: Subject to any disclaimer, the term of this patent is extended or adjusted under 35 U.S.C. 154(b) by 789 days.

(21) Appl. No.: 17/796,378

(22) PCT Filed: Sep. 22, 2021

(86) PCT No.: PCT/EP2021/076086
§ 371 (c)(1),
(2) Date: Jul. 29, 2022

(87) PCT Pub. No.: WO2022/063841
PCT Pub. Date: Mar. 31, 2022

(65) Prior Publication Data
US 2023/0078770 A1      Mar. 16, 2023

(30) Foreign Application Priority Data

Sep. 23, 2020    (EP) ..................................... 20197864

(51) Int. Cl.
| | |
|---|---|
| *C08L 15/02* | (2006.01) |
| *B60C 1/00* | (2006.01) |
| *C08K 3/04* | (2006.01) |
| *C08K 3/22* | (2006.01) |
| *C08K 3/34* | (2006.01) |
| *C08K 5/00* | (2006.01) |
| *C08K 5/11* | (2006.01) |
| *C08K 5/372* | (2006.01) |

(Continued)

(52) U.S. Cl.
CPC ............ *C08L 15/02* (2013.01); *B60C 1/0008* (2013.01); *C08K 3/04* (2013.01); *C08K 3/22* (2013.01); *C08K 3/34* (2013.01); *C08K 5/0025* (2013.01); *C08K 5/11* (2013.01); *C08K 5/372* (2013.01); *C08K 5/44* (2013.01); *C08K 5/47* (2013.01); *C08L 7/00* (2013.01); *C08L 9/06* (2013.01); *C08L 21/00* (2013.01); *C08L 23/22* (2013.01); *C08L 23/28* (2013.01); *C08L 61/04* (2013.01); *C08L 91/00* (2013.01); *C08L 97/005* (2013.01); *C08L 101/00* (2013.01); *C08K 2003/2296* (2013.01)

(58) Field of Classification Search
CPC ........ C08L 15/02; C08L 21/00; C08L 97/005; C08L 23/28; C08L 7/00; C08L 9/06; C08L 23/22; C08L 61/04; C08L 91/00;

C08L 101/00; C08K 3/04; C08K 3/22; C08K 3/34; C08K 5/0025; C08K 5/11; C08K 5/372; C08K 5/44; C08K 5/47; C08K 2003/2296; B60C 1/0008

See application file for complete search history.

(56) References Cited

U.S. PATENT DOCUMENTS

| | | | |
|---|---|---|---|
| 4,400,488 A | * | 8/1983 | Lal ......................... C08L 23/20 |
| | | | 525/240 |
| 4,477,611 A | | 10/1984 | Sperley |

(Continued)

FOREIGN PATENT DOCUMENTS

| | | |
|---|---|---|
| AT | 85234 B | 11/1921 |
| CA | 622715 A | 3/1956 |

(Continued)

OTHER PUBLICATIONS

Machine English translation of WO 2017/085278, Wittmann et al., May 26, 2017.*
Challenge Tech handmade tires catalogue (published 2015), 32 pages.
Continental Solid Tires catalogue (published 2018), 24 pages.
Michelin X Tweel Airless Radial Tire Family catalogue (published 2018), 8 pages.
Product information Ultrasil 360, Feb. 2018 (Evonik), 32 pages.
"ATSM International "Standard Test Method for Carbon Black—Total and External Surface Area by Nitrogen Adsorption"", Designation: D6556-09, Dec. 15, 2019.

(Continued)

*Primary Examiner* — Patrick D Niland
(74) *Attorney, Agent, or Firm* — Servilla Whitney LLC

(57) ABSTRACT

The invention relates to a rubber composition comprising a rubber component that comprises at least one halobutyl rubber selected from the group consisting of bromobutyl rubber and chlorobutyl rubber; and a filler component that comprises at least one filler F1 which has a $^{14}C$ content in the range of 0.20 to 0.45 Bq/g of carbon; a carbon content in the range of 60 wt. % to 85 wt. % relative to the ash-free and water-free filler; an STSA surface area in the range of 10 $m^2$/g of filler to 50 $m^2$/g of filler; and acidic hydroxyl groups on its surface; and wherein the proportion of halobutyl rubber in the rubber composition is 70 to 100 phr. The invention further relates to a vulcanisable and a vulcanised rubber composition based on the aforementioned rubber composition, a kit of parts for preparing the vulcanisable rubber composition, and methods for preparing the rubber composition and the vulcanisable rubber composition. Furthermore, the invention relates to a method for further processing the vulcanisable rubber composition, wherein webs are formed which are suitable, when cut to size, for use as inner liners in a method for manufacturing a pneumatic tyre. The invention also relates to the use of the aforementioned hydrothermally carbonised lignin for the preparation of rubber compositions for inner liners.

19 Claims, No Drawings

(51) Int. Cl.

| | |
|---|---|
| *C08K 5/44* | (2006.01) |
| *C08K 5/47* | (2006.01) |
| *C08L 7/00* | (2006.01) |
| *C08L 9/06* | (2006.01) |
| *C08L 21/00* | (2006.01) |
| *C08L 23/22* | (2025.01) |
| *C08L 23/28* | (2025.01) |
| *C08L 61/04* | (2006.01) |
| *C08L 91/00* | (2006.01) |
| *C08L 97/00* | (2006.01) |
| *C08L 101/00* | (2006.01) |

(56) References Cited

U.S. PATENT DOCUMENTS

| | | | |
|---|---|---|---|
| 4,598,105 A | 7/1986 | Weber et al. | |
| 5,192,361 A | 3/1993 | Schilling | |
| 5,534,561 A * | 7/1996 | Volke | C09J 123/20 |
| | | | 428/521 |
| 6,172,154 B1 | 1/2001 | Brown et al. | |
| 7,064,171 B1 | 6/2006 | Halasa et al. | |
| 7,671,126 B1 | 3/2010 | Sandstrom et al. | |
| 9,512,376 B2 | 12/2016 | Peus | |
| 9,902,816 B2 | 2/2018 | Wittmann et al. | |
| 10,611,885 B2 | 4/2020 | Wittmann et al. | |
| 11,306,209 B2 | 4/2022 | Wittmann et al. | |
| 11,312,864 B2 | 4/2022 | Wittmann et al. | |
| 2002/0156177 A1 | 10/2002 | Freund | |
| 2005/0100502 A1 | 5/2005 | Krauss et al. | |
| 2007/0100058 A1 | 5/2007 | Noguchi et al. | |
| 2007/0151178 A1 | 7/2007 | Baikerikar et al. | |
| 2007/0187033 A1 | 8/2007 | Shumacher et al. | |
| 2007/0193669 A1 | 8/2007 | Giannini et al. | |
| 2008/0066839 A1 | 3/2008 | Sandstrom et al. | |
| 2009/0099281 A1 | 4/2009 | Sakurai et al. | |
| 2010/0130639 A1 | 5/2010 | Mola et al. | |
| 2010/0204368 A1 | 8/2010 | Benko et al. | |
| 2010/0304141 A1 | 12/2010 | Kamegawa et al. | |
| 2011/0236816 A1 | 9/2011 | Stanyschofsky et al. | |
| 2012/0302664 A1 | 11/2012 | Kamada | |
| 2013/0046064 A1 | 2/2013 | Herd et al. | |
| 2013/0256113 A1 | 10/2013 | Tumiatti et al. | |
| 2013/0312472 A1 | 11/2013 | Brehmer et al. | |
| 2014/0116594 A1 | 5/2014 | Miyazaki | |
| 2014/0162873 A1 | 6/2014 | Gu | |
| 2014/0227325 A1 | 8/2014 | Naskar et al. | |
| 2014/0339467 A1 | 11/2014 | Elliot et al. | |
| 2015/0152255 A1 | 6/2015 | Mlayah et al. | |
| 2016/0230099 A1 | 8/2016 | Hilli et al. | |
| 2017/0226535 A1 | 8/2017 | Tudman | |
| 2017/0247255 A1 | 8/2017 | Wittmann | |
| 2017/0298166 A1* | 10/2017 | Pugh | C08K 3/36 |
| 2019/0284375 A1 | 9/2019 | Lahtinen et al. | |
| 2020/0308372 A1 | 10/2020 | Hojdis et al. | |

FOREIGN PATENT DOCUMENTS

| | | | |
|---|---|---|---|
| CA | 700368 A | 12/1964 | |
| CA | 818607 A | 7/1969 | |
| CA | 2920702 A1 | 2/2015 | |
| CA | 3002724 A1 | 5/2017 | |
| CN | 102212219 A | 10/2011 | |
| CN | 103951858 A | 7/2014 | |
| CN | 106243427 A | 12/2016 | |
| DE | 102007056170 A1 | 11/2008 | |
| DE | 2007022840 A1 | 12/2008 | |
| DE | 2008050966 A1 | 5/2009 | |
| DE | 2011113825 A1 | 3/2013 | |
| DE | 102015015549.0 | 11/2015 | |
| DE | 102014215807 B3 | 12/2015 | |
| DE | 102014215627 A1 | 2/2016 | |
| DE | 102016201801.9 | 2/2016 | |
| EP | 1233042 A2 | 8/2002 | |
| EP | 1457308 A1 | 9/2004 | |

| | | | |
|---|---|---|---|
| EP | 2042346 A1 | 4/2009 | |
| EP | 2130893 A2 | 12/2009 | |
| EP | 2223928 A1 | 9/2010 | |
| EP | 2305750 A1 | 4/2011 | |
| EP | 2479223 A1 | 7/2012 | |
| EP | 2484434 A1 | 8/2012 | |
| EP | 2671632 A2 | 12/2013 | |
| EP | 2937388 A1 | 10/2015 | |
| EP | 2796561 B1 | 7/2016 | |
| EP | 3053929 A1 | 8/2016 | |
| EP | 3059287 A1 | 8/2016 | |
| EP | 2681296 B1 | 4/2018 | |
| JP | 2005075856 A | 3/2005 | |
| JP | 2011006552 A | 1/2011 | |
| KR | 20140102807 A | 8/2014 | |
| RU | 2417172 C2 | 4/2011 | |
| RU | 2442806 C2 | 2/2012 | |
| WO | 2005100502 A1 | 10/2005 | |
| WO | 2008095589 A1 | 8/2008 | |
| WO | 2009127727 A1 | 10/2009 | |
| WO | 2009145784 A1 | 12/2009 | |
| WO | 2010006881 A1 | 1/2010 | |
| WO | 2010043562 A1 | 4/2010 | |
| WO | 2010112230 A1 | 10/2010 | |
| WO | 2011001315 A1 | 1/2011 | |
| WO | 2011013161 A1 | 2/2011 | |
| WO | 2012000033 A1 | 1/2012 | |
| WO | 2012168502 A1 | 12/2012 | |
| WO | 2014016344 A1 | 1/2014 | |
| WO | 2014122163 A1 | 8/2014 | |
| WO | 2014180753 A1 | 11/2014 | |
| WO | 2015018944 A1 | 2/2015 | |
| WO | 2015025076 A1 | 2/2015 | |
| WO | 2015056757 A1 | 4/2015 | |
| WO | 2015097196 A2 | 7/2015 | |
| WO | 2016001490 A1 | 1/2016 | |
| WO | 2016020383 A1 | 2/2016 | |
| WO | 2016207493 A1 | 12/2016 | |
| WO | 2017085278 A1 | 5/2017 | |
| WO | 2017109672 A1 | 6/2017 | |
| WO | 2020115143 A1 | 6/2020 | |
| WO | 2020140155 A1 | 7/2020 | |
| WO | 2020169809 A2 | 8/2020 | |
| WO | 2021005230 A1 | 1/2021 | |
| WO | 2022063841 A1 | 3/2022 | |

OTHER PUBLICATIONS

"Dynamic Mechanical Properties of Passenger and Light Truck Tire Treads", NHTSA, Feb. 2010, 28 pages.

English Translation of International Search Report in PCT/EP2021/076086 dated Jan. 3, 2022, 3 pages.

Written Opinion in PCT/EP2021/076086 dated Jan. 3, 2022, 5 pages.

"How much does a tyre weigh?", (1 Aug. 8, 2015; Author: oponeo. co.uk, Adam Winter; http://www.oponeo.co.uk:80/tyre-article/how-muchdoes-a-tyre-weigh - capture from web.archive.org dated May 5, 2016).

"Hydroisotop GmbH, „Nachwachsende Rohstoffe, Sekundarbrennstoffe, Apr. 13, 2018".

"Hydrothermal Carbonization—1. Influence of Lignin in Lignocel-luloses", Dec. 2011, Chemical Engineering & Technology 34(12) (DOI:10.1002/ceat.201100487).

"IPC vol. 1 Sec B, 8th. ed.", article WIPO, International Patent Classification (core level) (2006), pp. 106-108.

"Lignin Filler for Tires, C&EN (1957), pp. 28-32, 5 pages".

"Popular mechanics", 1914, vol. 22, No. 3, p. 402.

"Product information Ultrasil VN 3, Sep. 2018 (Evonik), 2 pages".

"The Pneumatic Tire", Feb. 2006, available from www.nhtsa.gov, 33 pages.

Brebu, Mihai , et al., "Thermal Degradation of Lignin—A Review", 2010, Cellulose Chem. Technol., 44(9), 353-363.

Brock, F. , et al., "Current Pretreatment Methods for AMS Radio-carbon Dating at the Oxford Radiocarbon Accelerator Unit (ORAU)", Radiocarbon, vol. 52, No. 1, pp. 103-112 (2010).

(56) References Cited

OTHER PUBLICATIONS

Chen, Xue , et al., "Effect of hydrothermal pretreatment on the structural changes of alkaline ethanol lignin from wheat straw", 2016, Scientific Reports 6:39354, DOI:1 0.1 038/srep39354, 1-9.

Chen, Xue , et al., "Effect of hydrothermal pretreatment on the structural changes of alkaline ethanol lignin from wheat straw", Scientific Reports, published Dec. 16, 2016, pp. 1-9, Springer Nature.

Clark, Samuel K., "Mechanics of Pneumatic Tires", 1971 , National Bureau of Standards Monograph 122, p. 360.

Czernik, J. , et al., "Preparation of Graphite Targets in the Gliwice Radiocarbon Laboratory for AMS 14C Dating", Radiocarbon, vol. 43, No. 2A, pp. 283-291 (2001).

Forrest, M.J. , "Rapra Review Reports, Report 139, Rubber Analysis—Polymers, Compounds and Products", 158 pages, vol. 12 issue No. 7.

Guy, L. , et al., "New Insights in the Dynamic Properties of Precipitated Silica Filled Rubber Using a New High Surface Silica", Raw Materials and Applications (2009) pp. 383-391.

Hofmann, W. , "Rubber Technology Handbook", Dusseldorf, Spring, p. 3 (1980).

Jiang, Guozhan , et al., "Effect of the temperature of the composition of lignin pyrolysis products", Energy Fuels, 2010, 24, 4470-4475.

Kaewsakul, W. , et al., "Optimization of Rubber Formulation for Silicareinforced Natural Rubber Compounds", Rubber Chemistry and Technology, vol. 86, No. 2, 2013, 17 pages.

Konecny, P. , et al., "Dynamic mechanical properties of filled styrene butadiene rubber compounds: comparison of tensile and shear data", Polym. Adv. Technol, 2007: 18:122-127.

Kostial, P. , et al., "The Chosen Aspects of Materials and Construction Influence on the Tire Safety in: Composites and Their Properties", Aug. 22, 2012 (DOI: 10.5772/48181), 34 pages.

Leister, G. , "Fahrzeugrader-Fahrzeugreifen", 2nd Ed., 2015, 175 pages.

Limper, Andreas , "Mixing of Rubber Compounds", Carl Hanser Verlag, 2011 pp. 71-78.

Popa, V. I., et al., "Nanoparticles based on modified lignins with biocide properties", Cellulose Chemistry and Technology, vol. 45, Issue 3-4, pp. 221-226 (2011).

Ramsey, C.B. , "Bayesian Analysis of Radiocarbon Dates", Radiocarbon, vol. 51, No. 1,pp. 337-360 (2009).

Ramsey, C.B. , "Development of the Radiocarbon Calibration Program", Radiocarbon, vol. 43, No. 2A, pp. 355-363 (2003).

Ramsey, C.B. , et al., "Recent and Planned Developments of the Program OxCal", Radiocarbon, vol. 55, Issue 2, pp. 720-730 (2013).

Reimer, P.J. , et al., "INTCAL 13 and Marine13 Radiocarbon Age Calibration Curves 0-50,000 Years CAL BP", Radiocarbon, vol. 55, No. 4, pp. 1869-1887 (2013).

Roethemeyer, F. , et al., "Rubber technology. Materials—Processing—Products", 3rd ed. Carl Hanser Verlag, pp. 1 (2013) (Abstract Only).

Ross, Kelly , et al., "Comparative analysis of pyrolysis products from a variety of herbaceous, Canadian crop residues", Wood Journal of Agricultural Sciences, 2011, 7(6), 763-776.

Sazanov, Yu. N., et al., "Thermochemistry of Lignin", Russian J. of Appl. Chemistry, 2010, vol. 83, No. 2, 175-194.

Stuiver, M. , et al., "Discussion. Reporting of 14 C Data", Radiocarbon, vol. 19, No. 3, pp. 355-363 (1977).

Teh, Swe Jyan, et al., "ZnCl2/NaCl-Catalysed Hydrothermal Carbonization of Glucose and Oil Palm Shell Fiber", Nanoscience and Nanotechnology Letters vol. 7, 611-615, 2015.

Wikberg, Hanne , et al., "Structural and morphological changes in Kraft lignin during hydrothermal carbonization", 2015, ACS Sustainable Chem. Eng.,3, 2737-2745.

Zhang, Bo , et al., "Reaction Kinetics of the Hydrothermal Treatment of Lignin", Appl. Biochem. Biotechnol., Mar. 2008, v. 147, pp. 119-131.

Zhao, J. , et al., "Thermal degradation of softwood lignin and hardwood lignin by TGFTIR and Py-GC/MS", Polymer Degradation and Stability, 2014, 108, 133-138.

* cited by examiner

RUBBER COMPOSITION FOR AN INNER LINER FOR PNEUMATIC VEHICLE TYRES

CROSS-REFERENCE TO RELATED APPLICATIONS

This application is the National Stage entry of PCT/EP2021/076086, filed on Sep. 22, 2021, which claims priority to European Application. Ser. No. 20/197,864.0, filed Sep. 23, 2020, the entire disclosures of which are hereby incorporated by reference herein.

FIELD OF THE INVENTION

The invention relates to rubber compositions, more particularly to vulcanisable and vulcanised rubber compositions for inner liners of pneumatic vehicle tyres. The invention further relates to a kit of parts for the manufacture thereof and methods for the manufacture and further processing thereof, as well as a method for manufacturing of pneumatic tyres. The invention further relates to the use of special fillers made of regrowing raw materials for the preparation of the rubber compositions, in particular for inner liners.

BACKGROUND OF THE INVENTION

Pneumatic vehicle tyres have a complex structure. Correspondingly, the demands placed on them are diverse. On the one hand, short braking distances must be ensured on dry and wet roads, and they must have good abrasion properties and low rolling resistance on the other hand. In addition, the vehicle tyres must comply with the requirements of the legislator.

To ensure such a diverse performance profile, the individual tyre components are specialised and consist of a plurality of different materials, such as metals, polymer textile materials and various rubber-based components.

Depending on the design of the pneumatic tyres, a distinction is made between radial tyres, cross-ply tyres and bias-ply tyres or bias-belted tyres. A typical pneumatic tyre, as an example a radial-ply belted tyre, comprises at least a belt, a belt cover, a tread, reinforcing strips, sidewalls, bead fillers, bead wires, an inner liner and a carcass.

The belt usually consists of layers of stranded steel wire that are rubber-coated and angularly disposed. Its main purpose is to provide structural strength to the tyre in its air-filled state. The belt further provides for driving stability during acceleration, braking and cornering. It influences the rolling resistance and significantly contributes to the tyre's mileage.

The belt overlay located between the tread and the upper belt serves for improving high-speed performance and limits the tyre diameter at increasing speed.

The tread is essentially responsible for the driving characteristics. The rubber compound of the treads determines the abrasion characteristics and the dynamic driving characteristics in different weather conditions (on wet and dry roads, in cold and warm weather, on ice and snow). The design of the tread pattern, in turn, is largely responsible for the tyre's behaviour in case of aquaplaning and wet conditions as well as on snow, and also determines its noise behaviour.

Reinforcing strips are optionally used in the region of the bead filler to further improve the strength of the tyre as well as the driving characteristics.

The sidewall protects the carcass against lateral damage and atmospheric influences. The rubber compound for the sidewall is flexible and abrasion-resistant and contains relatively large quantities of aggregates for protection against aging and ozone.

The bead filler rides on the bead wire/bead core. Its form and configuration provide driving stability and have an influence on the steering precision and the suspension comfort. Rubber compounds for bead fillers are typically very strong and relatively hard, which is ensured, among other things, by a high degree of crosslinking using highly dosed vulcanisation systems and by the selection of the fillers.

The bead wire is the inner part of the tyre bead and consists of stranded steel wires coated with rubber that are annularly coiled and hold the tyre stably on the rim. In the common tubeless configuration, the tyre bead (also called tyre base or foot) presses against the rim flange and closes the tyre in an airtight manner. The steel cords and wires in the bead core, the tread or in the carcass of the full steel tyre must firmly connect with the surrounding rubber compound in order to act as a composite. For that purpose, the steel wires are often coated with brass or bronze. Only thereafter they are formed, using a wire bonding compound, into tyre building parts which in turn are assembled to form a tyre blank. Wire bonding compounds are relatively strong, tear resistant due to their high proportion of natural rubber and achieve a strong connection to the brass or bronze coating, for example by special resin additives and a high sulfur content. The permanent connection is formed during vulcanisation.

The carcass forms the basic structure of the tyre and consists of one or more textile fabric layers (Rayon, Nylon, polyester, aramid) or steel cord layers (for trucks) that are embedded in rubber. The carcass is put under tension by means of the tyre air pressure and is therefore substantially responsible for the transmission of forces, between the rim and the tread/street. It is connected to the tyre bead in the tyre base and thus holds the tyre together. The carcass works as a composite between the cord layers which warrant for the strength and the transmission of forces and a rubber compound that encloses the parallel cords. Because of the constant deformation of the tyre, the cord compound has to be fatigue-resistant, which is most often achieved by a blend of natural rubber and synthetic rubbers, but it also has to form a firm connection with the cords. For this purpose, the cords are coated with a rubber compound after stranding/twisting. The cords having that finishing are coated with the unvulcanised rubber compound. Resin systems in the special compounds then react with the cord finishing during vulcanisation to form a durable composite.

Modern tyres are usually tubeless, as described above. The so-called inner liner is a radially inwardly disposed layer of a rubber compound and, to the largest extent possible, impermeable to air. It is also called the inner core or inner plate, and is used to ensure that the air pumped into the tyre does not escape over a long period of time, as the air pressure significantly affects the driving characteristics and durability of the tyre. In addition, the internal pressure also has an influence on the rolling resistance of the tyre. A decrease in air pressure leads to a higher dynamic deformation of the tyre which in turn causes the unwanted conversion of a part of the kinetic energy into thermal energy. This has a negative influence on the fuel consumption of the vehicle and thus on the associated emissions of carbon dioxide.

In addition, the inner liner protects the carcass against diffusion of air and humidity therein and prevents any damage to the strength-providing elements of the carcass and/or the belt. For the inner liner to remain airtight to the largest possible extent, it should also have good tear and fatigue resistance so that no tears develop during driving which would affect the air tightness.

Due to this specific requirements profile, rubber compounds for inner liners have, with regard to the rubbers and fillers to be used as well as the weight proportions of the constituents relative to one another, completely different compositions than the rubber compounds for the other tyre parts, but they still need to be compatible with the adjacent tyre parts and especially need to have good adhesion to those. In addition to the type of rubbers, minimum quantities for different rubbers in the rubber compound also play a role, as do various specific parameters and properties of the fillers that can be used.

Among others, halobutyl rubbers such as chlorobutyl rubber or bromobutyl rubber, occasionally blended with other rubbers, are used as rubbers for the inner liner. Butyl and halobutyl rubbers have a low gas permeability. The blending of halobutyl rubbers with other rubbers such as for example natural rubber is carried out for reasons of increasing the tack during assembly, reducing costs and adjusting the mechanical properties.

By additional dosing of voluminous fillers with low or no activity to the rubber compound of the inner liners, their airtightness can be further increased. The fillers used to date include furnace carbon blacks in particular.

In order to prevent the formation of cracks under dynamic loads, inner liners must have a balanced modulus of elasticity and a matched hardness, which is usually in conflict with a high proportion of non-active fillers. Therefore, mineral oil based softening agents are often added to the rubber composition, which reduce the modulus of elasticity and the hardness of the composition, but at the same time increase the gas permeability again, which results in a relatively narrow optimum range for the amounts of mineral oil based softening agent and filler used.

In addition, many fillers, such as e. g. carbon blacks of the type N 660, have relatively high densities of about 1.8 g/cm$^3$ or higher. Accordingly, the rubber compositions compounded with such fillers also have a higher density and thus a higher weight for the same volume. However, the higher density of the filler also causes a higher weight of the inner liner, and ultimately of the pneumatic tyre, which in turn entails higher fuel consumption.

Further, industrial carbon blacks are produced petrochemically, by incomplete combustion or pyrolysis of hydrocarbons. The use of fossil energy sources for the production of fillers, however, must be avoided or reduced to a minimum from an environmental point of view. Instead, the objective should be to provide fillers for compounding that are based on biomass and that meet the manifold requirements for inner liners.

In the field of the preparation of rubber compositions for use in tyres in general, among other things, WO 2017/085278 A1 discloses the use of so-called HTC lignin, a lignin converted by hydrothermal carbonisation, as a filler that substitutes for industrial carbon blacks.

Lignins are solid biopolymers that are incorporated into plant cell walls and thus effect the lignification of plant cells. They are therefore contained in biologically regrowing raw materials and—in their hydrothermally carbonised form— have potential as an environmentally friendly alternative to industrial carbon blacks in rubber compositions.

However, the use of such fillers in special rubber compositions such as those found in inner liners is not explicitly described, especially since there is no knowledge about the possible interactions of inner liner rubbers, which often carry reactive atoms, with the reactive surface groups of HTC lignins, and the properties of the vulcanised rubbers resulting therefrom are completely unresearched.

WO 2017/194346 A1 also describes the use of HTC lignins in rubber compounds for pneumatic tyre components, in particular together with a methylene donor compound such as e. g. hexa(methoxymethyl)melamine, in order to increase the stiffness of a cured rubber component of a pneumatic tyre and, among other things, to replace phenolic resins, and/or in combination with silane-based coupling agents. One of the objects addressed in WO 2017/194346 is a decrease reduction of the rolling resistance of tyres. Natural rubber, polybutadiene rubber, styrene-butadiene rubber and polyisoprene rubber are named as suitable rubber materials. WO 2017/194346 A1 discloses the suitability of the rubber compounds described therein for the tread areas of a pneumatic tyre, for the sidewalls and the tyre bead. A rubber compound that meets the requirements of an inner liner is not described.

EP 3 470 457 A1 also discloses vulcanisable sulfur-containing rubber compounds for vehicle tyres. The fillers used for the tested solvent-polymerised styrene-butadiene rubbers (SSBR) were HTC coals that were obtained from various feedstocks, were produced with the addition of metal halides and exhibited BET surface areas of up to more than 180 m$^2$/g. Among these, HTC coals with a BET surface area of 90 to 140 m$^2$/g were found to be particularly preferred, since they were said to exhibit enhanced surface roughness and optimised surface functionality.

In a synoptic view of the state of the art, there is therefore a particular need for rubber compositions or rubber compounds which are suitable for inner liners of pneumatic tyres, contain environmentally friendly material alternatives to carbon black that are based on regrowing raw materials as fillers, and provide vulcanised rubber compositions which satisfy the requirements for inner liners of pneumatic tyres, in particular with regard to airtightness and crack resistance, and which preferably have a lower density than carbon black-containing rubber compositions and good tear resistance and tear propagation resistance.

SUMMARY OF THE INVENTION

The problems underlying the invention could be solved by providing a rubber composition that comprises
a rubber component, which
    comprises at least one halobutyl rubber selected from the group consisting of bromobutyl rubber and chlorobutyl rubber,
a filler component which
    comprises at least one filler F1 that
    has a $^{14}$C content in the range of 0.20 to 0.45 Bq/g of carbon;
    a carbon content in the range of 60 wt. % to 85 wt. % relative to the ash-free and water-free filler;
    has an STSA surface area in the range of 10 m$^2$/g of filler to 50 m$^2$/g of filler; and
    has acidic hydroxyl groups on its surface;
and wherein the proportion of halobutyl rubber in the rubber composition is 70 to 100 phr.

The phr (parts per hundred parts of rubber by weight) specification used herein is the quantity specification commonly used in the rubber industry for compound formulations. The dosage of the parts by weight of the individual constituents is always based on 100 parts by weight of the total mass of all rubbers present in the compound.

This rubber composition will hereinafter also be referred to as the rubber composition according to the invention or the rubber composition according to the present invention.

The invention further relates to a vulcanisable rubber composition comprising or consisting of a rubber composition according to the invention and a vulcanisation system containing zinc oxide and/or sulfur.

This vulcanisable rubber composition will hereinafter also be referred to as the vulcanisable rubber composition according to the invention or the vulcanisable rubber composition according to the present invention.

A further object of the invention is a kit of parts comprising, in spatially separated form, a rubber composition according to the invention and a vulcanisation system containing zinc oxide and/or sulfur.

This kit of parts will hereinafter also be referred to as the kit of parts according to the invention or the kit of parts according to the present invention.

Another object of the present invention is a method for preparing a rubber composition according to the invention and a vulcanisable rubber composition according to the invention, the latter being obtained by preparing, in a first stage, the rubber composition according to the invention as a base compound (masterbatch) by compounding the constituents of the rubber composition and by performing, in a second stage, the admixture of the constituents of the vulcanisation system.

These methods will also be referred to as methods according to the invention for preparing the rubber composition according to the invention or the vulcanisable rubber composition according to the invention.

Another object of the invention is a method for further processing of the vulcanisable rubber compositions according to the invention, in which they are formed into a web by calendering, extrusion or the so-called roller-head process.

This method will also be referred to as the method for further processing according to the invention or as the method for further processing according to the present invention.

Another object of the invention is a method for manufacturing a pneumatic tyre, comprising the further processing method according to the invention, followed by a step of cutting to size the obtained web into an inner liner of pneumatic tyres, and comprising the subsequent step of vulcanising the inner liner thus obtained, preferably together with the carcass of a pneumatic tyre.

The method will also be referred to as the method according to the invention for manufacturing a pneumatic tyre or as the method according to the present invention for manufacturing a pneumatic tyre.

Another object of the present invention is the use of the fillers as characterised above that are suitable in the context of the invention for preparing rubber compositions for inner liners.

This use will also be referred to as the use according to the invention or as the use according to the present invention.

DETAILED DESCRIPTION OF THE INVENTION

In the following, the constituents of the rubber compositions respectively used in the rubber compositions, the methods and the use cited above, as well as particularly suitable process sequences will be described in detail.

Rubber Composition

Rubbers

In the context of the present invention, one or more halobutyl rubbers selected from the group consisting of chlorobutyl rubbers (CIIR; chloro-isobutene-isoprene rubber) and bromobutyl rubbers (BIIR; bromo-isobutene-isoprene rubber) are used.

Halobutyl rubbers are halogenated isobutene-isoprene rubbers. They are obtainable by halogenation, especially bromination and/or chlorination of butyl rubbers.

Butyl rubbers, in turn, are predominantly composed of isobutene units, the remaining part being isoprene units. Particularly preferably the proportion of isobutene units is 95 to 99.5 mol % and the proportion of the isoprene units is 0.5 to 5 mol %, more particularly preferably, the proportion of isobutene units is 97 to 99.2 mol % and the proportion of the isoprene units is 0.8 to 3 mol %, wherein the proportion of isobutene units and isoprene units preferably add up to 100 mol % of the monomers contained in and polymerised into the polymer. Butyl rubbers generally have low gas and moisture permeability.

Due to the isoprene units polymerised into them, the butyl rubbers have carbon-carbon double bonds, which serve both for vulcanisation and for the modification with halogens such as, in particular, chlorine and bromine.

The halobutyl rubbers obtainable by modification with halogens (halogenation) have a higher reactivity than the butyl rubbers and thus a broader spectrum in terms of vulcanisation possibilities, such as in particular the co-vulcanisation possibilities with other rubbers such as natural rubber (NR), butyl rubber (IIR; isobutene isoprene rubber) and styrene-butadiene rubber (SBR).

Among the halobutyl rubbers, the bromobutyl rubbers are more reactive due to their weaker carbon-bromide bond, as compared to the chlorobutyl rubbers that have a carbon-chlorine bond, which opens an even broader spectrum of vulcanisation systems for bromobutyl rubbers. Bromobutyl rubbers vulcanise more rapidly and usually have better adhesion to diene rubbers.

Among the halobutyl rubbers, bromobutyl rubbers are particularly preferred in the context of the present invention.

It is however also possible to use compounds of one or more bromobutyl rubbers with one or more chlorobutyl rubbers as the halobutyl rubber component. Here, the bromobutyl rubbers increase the vulcanisation rate.

Chlorobutyl rubbers (CIIR) suitable in the context of the present invention preferably contain between 1.1 and 1.3 wt. % of chlorine, the bromobutyl rubbers (BIIR) preferably contain between 1.9 to 2.1 wt. % of bromine. This corresponds to a proportion of reactive positions of about 2 mol %.

The viscosities of the halobutyl rubbers are preferably comprised between 35 and 55 Mooney units (ML (1+8), 125° C.). Just like butyl rubber, the products contain almost no secondary constituents (rubber proportion>98.5). The halobutyl rubbers preferably contain stabilisers, in particular sterically hindered phenols as stabilisers.

The rubber composition according to the invention can contain, in addition to the halobutyl rubbers, one or more further rubbers that differ from the halobutyl rubbers.

Particularly preferred as further rubbers that differ from the halobutyl rubbers are, if present, natural rubber, butyl rubber and styrene-butadiene rubber.

For example, the adhesion to other rubber-based tyre components, in particular as compared to general-purpose rubbers, can thus be increased by admixture of natural rubber to halobutyl rubbers. By cross-linking the different rubbers, it is possible to create synergies with regard to tensile strength, so that it can lie even above the tensile strength of the individual rubbers. This is especially true with the use of vulcanisation systems comprising zinc oxide, sulfur and a thiazole, such as e. g. mercaptobenzothiazole disulfide (MBTS). On the other hand, the gas and moisture permeability of the vulcanised end product typically increases with the admixture of natural rubber.

The admixture of styrene-butadiene rubbers to halobutyl rubbers can occur in the same way as the admixture of natural rubbers, but typically has no particular advantages over the latter, so that the use of natural rubbers is usually preferred to that of the styrene-butadiene rubbers.

The admixture of up to 30 phr, preferably up to at most 20 phr butyl rubber to halobutyl rubber has typically only minor to no effect on the gas and moisture permeability of the vulcanised end products, but it can decrease the vulcanisation rate and increase the heat resistance, where this is desired.

The total amount of halobutyl rubber is 70 to 100 phr, preferably 80 to 100 phr, particularly preferably 90 to 100 phr, and most preferably 100 phr.

In the case that the rubber compound contains less than 100 phr halobutyl rubber, at least one other rubber is contained in the rubber composition, preferably one of the rubbers mentioned above, so that the total amount of rubbers contained is 100 phr.

This means that the amount of other rubbers that differ from the halobutyl rubbers is from 0 to 30 phr, preferably from 0 to 20 phr, particularly preferably from 0 to 10 phr and more particularly preferably 0 phr.

Fillers F1

Obligatorily used in the filler component is a filler F1 that has a $^{14}$C content in the range of 0.20 to 0.45 Bq/g carbon, preferably 0.23 to 0.42 Bq/g carbon;

has a carbon content in the range of 60 wt. % to 85 wt. %, preferably 63 wt. % to 80 wt. %, and particularly preferably 65 wt. % to 75 wt. %, and more particularly preferably 68 wt. % to 73 wt. %, relative to the ash-free and water-free filler;

has an STSA surface area in the range of 10 m²/g filler to 50 m²/g filler, preferably 15 m²/g filler to 45 m²/g filler and particularly preferably 20 m²/g filler to 40 m²/g filler;

and has acidic hydroxyl groups on its surface.

Such fillers F1 are hereinafter referred to as "fillers to be used according to the invention" or "fillers usable according to the invention" or "fillers used according to the invention".

The required $^{14}$C content cited above is achieved by fillers obtained from biomass, by further treatment or reaction, preferably by decomposition, wherein the decomposition can be carried out thermally, chemically and/or biologically, and preferably is carried out thermally and chemically. Thus, filler obtained from fossil materials, such as fossil fuels in particular, do not fall under the definition according to the present invention of the fillers to be used according to the invention, since they do not possess a corresponding $^{14}$C content.

Herein, biomass is in principle defined as any biomass, wherein the term "biomass" herein includes so-called phytomass, i.e., biomass originating from plants, zoomass, i.e., biomass originating from animals, and microbial biomass, i.e., biomass originating from microorganisms including fungi, wherein the biomass is dry biomass or fresh biomass, and it originates from dead or living organisms.

The biomass particularly preferred herein for the preparation of the fillers is phytomass, preferably dead phytomass. Dead phytomass comprises, among other things, dead, rejected or detached plants and their parts. These include, for example, broken and torn leaves, side shoots, twigs and branches, the fallen leaves, felled or pruned trees, as well as seeds and fruits and parts derived therefrom, but also sawdust, wood shavings/chips and other products derived from wood processing.

The carbon content cited above is typically achieved by the fillers based on the decomposition of biomass and can be determined by elemental analysis according to DIN 51732: 2014-7.

Preferably, the fillers have an oxygen content in the range of 15 wt. % to 30 wt. %, preferably 17 wt. % to 28 wt. % and particularly preferably 20 wt. % to 25 wt. %, relative to the ash-free and water-free filler. The oxygen content can be determined by high-temperature pyrolysis, for example using the EuroEA3000 CHNS-O Analyzer of the company EuroVector S.p.A.

In addition, the fillers of the type defined above have acidic hydroxyl groups on their surface (so-called surface-available acidic hydroxyl groups). The determination of the surface-available acidic hydroxyl groups can be carried out qualitatively and quantitatively by colorimetry according to Sipponen. The method according to Sipponen is based on the adsorption of the alkaline dye Azure B onto the acidic hydroxyl groups accessible on the filler surface. If there is a corresponding adsorption under the conditions cited in the article mentioned below under item 2.9 (p. 82), acidic, surface-available hydroxyl groups in the sense of the present invention are present. Further details can be taken from the paper "Determination of surface-accessible acidic hydroxyls and surface area of lignin by cation dye adsorption" (Bioresource Technology 169 (2014) 80-87). In a quantitative determination, the amount of surface-available acidic hydroxyl groups is given in mmol/g of the filler. Preferably, the amount of surface-available acidic hydroxyl groups is in the range of 0.05 mmol/g to 40 mmol/g, particularly preferably 0.1 mmol/g to 30 mmol/g, and more particularly preferably 0.15 to 30 mmol/g. Preferred surface-available acidic hydroxyl groups are phenolic hydroxyl groups.

Clear differences between the biomass-based fillers also exist in their BET surfaces (specific total surface area according to Brunauer, Emmett and Teller) as well as their external surfaces (STSA surface area; Statistical Thickness Surface Area).

For example, WO 2017/085278 A1 describes STSA surface areas in the range of 5 to 200 m²/g for hydrothermally carbonised lignins, i.e., fillers based on dead phytomass containing lignin that is obtained by hydrothermal treatment. In the experimental part of the publication, even those with an STSA surface area of only 2.6 m²/g are mentioned.

All the above ranges characterising fillers F1 in terms of their $^{14}$C content, carbon and oxygen content, STSA surface area and surface-available acid groups apply equally to all fillers F1 to be used according to the invention, preferably to lignin-based fillers, which herein represent a preferred class of fillers that can be produced from phytomass.

In their textbook "Kautschuk Technologie—Werkstoffe Verarbeitung Produkte" (3rd revised and expanded edition, 2013, pages 1196-1197), Röthemeyer and Sommer classify various rubbers into three groups, those with low polarity and high degree of swelling in oil, those with medium polarity and medium degree of swelling in oil, and those with high polarity and low degree of swelling in oil. Despite their reactivity, halobutyl rubbers have low polarity.

Particularly surprising, therefore, is the good compatibility of the fillers to be used according to the invention, in particular of the lignin-based fillers, with the halobutyl rubbers, which have only a low polarity, since the fillers to be used according to the invention have a high polarity compared to the typical industrial carbon blacks, which is due, among other things, to the content of surface-available acidic hydroxyl groups. But also the higher oxygen content compared to the industrial carbon blacks contributes to this.

Among the lignin-based fillers, in turn, lignin-containing phytomass that is hydrothermally treated is particularly preferred. Preferred treatment is a hydrothermal treatment at temperatures between 150° C. and 250° C. in the presence of liquid water. Compared to the original lignin, the carbon content usually increases and the oxygen content decreases. Suitable methods for treatment are for example described in WO 2017/085278 A1. Lignin-based fillers obtained by hydrothermal treatment will hereinafter also be referred to as HTC lignins. A hydrothermal treatment at temperatures between 150° C. and 250° C. in the presence of liquid water will also be referred to as hydrothermal carbonisation in the following. The HTC lignins described in the following are the preferred fillers to be used in the context of the present invention.

The rubber composition according to the invention preferably contains 50 to 100, particularly preferably 55 to 85, more particularly preferably 60 to 80, such as for example 65 to 75 phr of the filler to be used according to the invention as defined above. If fillers with a higher range of the claimed STSA surface area are used, their dosage may be reduced, which leads to an inner liner with lower weight and reinforcement properties attributed to the STSA surface area. If a filler with an STSA surface area in the lower claimed range is used, the dosage of the filler can significantly be increased, which leads to a decreased gas permeation and improved tear resistance. The reinforcement properties then do not reach the level of the rubber compositions that are reinforced with a filler having a higher STSA surface area.

HTC Lignins

HTC lignins are obtained by hydrothermal carbonisation of lignin-containing raw materials and represent particularly preferred fillers F1 usable according to the invention. The properties of HTC lignins can vary over wide ranges. For example, different HTC lignins differ in their BET and STSA surface area, the ash content, pH, and heat loss, as well as the density and particle size and the amount of surface-available acidic hydroxyl groups.

In the context of the present invention, special HTC lignins, as fillers to be used according to the invention, serve as a substitute material for the carbon blacks usually contained in rubber compositions for inner liners. The preparation of the HTC lignins usable according to the invention is described in WO 2017/085278A1 for example.

While the above-mentioned documents WO 2017/085278 A1 and WO 2017/194346 A1 generally mention the use of HTC lignins as possible substitute materials for carbon blacks in tyres, it should not be concluded that the behaviour of HTC lignins in ordinary rubber compositions would readily be transferable to the special rubber compositions of the present invention, which contain more reactive halobutyl rubbers. This is especially true for their use in rubber compositions based on halobutyl rubbers, since these have completely different properties from ordinary rubber compositions and, due to the high reactivity of the halogen atoms, in particular the chlorine and especially the bromine atoms, an interaction or even reaction with the fillers that can be used according to the invention, in particular the HTC lignins, has to be expected, which have, as compared to industrial carbon blacks, a chemically different surface and composition. In particular, the difference already mentioned above between industrial carbon blacks and the fillers to be used in the present invention in terms of the presence of surface-available acidic hydroxyl groups, preferably phenolic hydroxyl groups, leads to surprisingly good incorporability of the fillers and compatibility of the same with the rubber component, even without the use of compatibilisers, in particular without the use of silane compounds in the rubber compositions according to the invention. The resulting vulcanised products have surprisingly good performance, wherein even critical properties, such as the extremely low gas permeability required for inner liners, are improved.

Therefore, a purposeful selection of special fillers was required for the present invention. Among these, HTC lignins have proven to be particularly suitable, as they have both excellent compatibility with the other constituents of the rubber composition, and also compatibility with the special vulcanisation systems described below, and in particular enable the desired gas barrier properties and prevent the formation of tears and tear propagation.

The fillers to be used according to the invention, and in particular the HTC lignins, which are used in the present invention, allow for adjustment of a good balance of different properties with regard to their use in inner liners. Thus, they have good reinforcing properties, expressed by stress values and tear strength, high elongation at break, and they also facilitate good dispersibility of the filler particles in the rubber.

To achieve this, it is advantageous that the fillers used in the context of the invention, preferably the HTC lignins have—in addition to the STSA surface area indicated above—a BET surface area in the range of 15 to 50 g/m$^2$, preferably in the range of 18 to 45 g/m$^2$ and particularly preferably 20 to 40 g/m$^2$.

Preferably, the fillers used according to the invention, preferably the HTC lignins, have a pH>7 and <9, particularly preferably >7.5 and <8.5.

It was also found that ash content and heat loss have only a minor influence, as long as the values are not too high and thus reduce the content of active ingredients too much.

The fillers used herein, preferably the HTC lignins, have the potential to completely replace carbon blacks in the preparation of rubber compositions, especially those for the production of inner liners, as will be shown in the experimental part of the present application. This means that preferred rubber compositions according to the invention do not need to contain carbon blacks from materials of fossil origin.

This makes it possible, among other things, to produce inner liners for pneumatic tyres which have significantly lower weight, improved air holding capacity and improved crack resistance, with the same dimensions of comparable inner liners obtained using carbon blacks. Especially the better air holding capacity makes sure that the rolling resistance of the tyre is at the optimum level over a long period of time and therefore allows a more economical operation of the vehicle equipped with the tyres.

It is also possible, however, to replace only a part of the carbon blacks from materials of fossil origin with one or more of the fillers usable according to the invention, preferably the HTC lignins. The benefits are still significant, but to a lesser extent.

Other Constituents of the Rubber Composition

Other Fillers F2

In addition to the above-mentioned fillers to be used according to the invention F1, preferably HTC lignins F1, the rubber compositions may contain other fillers F2 that differ from F1.

In the case that the fillers F1 to be used according to the invention, preferably the HTC lignins F1, only serve as a partial substitute for common industrial carbon blacks, the rubber compositions according to the invention may also contain industrial carbon blacks, in particular furnace carbon blacks, as classified as general-purpose carbon blacks under ASTM Code N660.

Among the possible fillers F2 are in particular inorganic fillers of different particle size, particle surface area and chemical nature, with varying potential to influence the vulcanisation behaviour. In the event that further fillers are included, these should preferably have properties as similar as possible to the fillers F1 used in the rubber composition according to the invention, in particular HTC lignins, especially with regard to their pH values.

If other fillers F2 are used, they are preferably phyllosilicates such as clay minerals, for example talc; carbonates such as calcium carbonate; silicates such as for example calcium, magnesium and aluminium silicates; and oxides such as for example magnesium oxide and silica. However, in the context of the present invention, zinc oxide does not fall under the fillers, since zinc oxide here fulfils the task of a vulcaniser. Additional fillers must however be chosen with care, since higher amounts of magnesium oxide, for example, can negatively affect the adhesion to adjacent tyre layers, and silica tends to bind organic molecules, such as the thiazoles used in some vulcanisation systems, to its surface and thus inhibit their action.

Inorganic fillers, among them preferably silica and other fillers, which carry Si—OH groups on their surface, may also be surface-treated. In particular, a silanisation with organosilanes, such as for example alkylalkoxysilanes or aminoalkylalkoxysilanes or mercaptoalkylalkoxysilanes, may be of advantage. The alkoxysilane groups can, for example, bind to the surfaces of silicates or silica, or to other suitable groups, by hydrolytic condensation, while the amino groups and thiol groups, for example, can react with the halogenated, in particular brominated, isoprene units of the halobutyl rubbers. This can cause a mechanical reinforcement of the vulcanised rubber compositions of the present invention.

The utilisation of silanised fillers can lead to an acceleration in achieving the final vulcanisation state and increase the edge tearing resistance.

The fillers can be used individually or in combination.

Preferably, no other fillers F2 are used in addition to the fillers F1 used according to the invention, in particular the HTC lignins F1. If other fillers F2 are used, they are preferably industrial carbon blacks, in particular furnace carbon blacks. However, in particular phyllosilicates such as clay minerals, and for example talc, are preferred among the other fillers F2.

In the event that other fillers F2 are used, their proportion is preferably less than 40 phr, particularly preferably 20 to 40 phr and particularly preferably 25 to 35 phr.

Softening Agents

With the use of softening agents, it is possible to influence properties of the unvulcanised rubber composition, such as processability in particular, but also properties of the vulcanised rubber composition, such as its flexibility, especially at low temperatures.

Particularly suitable softening agents in the context of the present invention are mineral oils from the group of paraffinic oils (substantially saturated chain-shaped hydrocarbons) and naphthenic oils (substantially saturated ring-shaped hydrocarbons). The use of aromatic hydrocarbon oils is possible, but less advantageous, as they show poorer dissolution behaviour with halobutyl rubbers. However, with regard to the adhesion of the rubber composition to other rubber-containing components in tyres, such as for example the carcass, a mixture of paraffinic and/or naphthenic oils could be advantageous as softening agent.

Other softening agents are for example esters of aliphatic dicarboxylic acids, such as for example adipic acid or sebacic acid, paraffin waxes and polyethylene waxes.

Among the softening agents, paraffinic oils and naphthenic oils are particularly suitable in the context of the present invention.

Preferably, the softening agents, and among them more particularly preferably the paraffinic and/or naphthenic oils, are used in an amount of 0 to 15 phr, preferably 5 to 15 phr, particularly preferably 7 to 13 phr.

Adhesion-Enhancing Resins ("Tackifying Resins")

So-called adhesion-enhancing resins can be used to improve the adhesion of the vulcanised rubber compound of the present invention to other adjacent tyre components.

Particularly suitable resins are those based on phenol, preferably from the group consisting of phenolic resins, phenol-formaldehyde resins and phenol-acetylene resins.

In addition to the resins based on phenol, aliphatic hydrocarbon resins such as Escorez™ 1102 RM from ExxonMobil, as well as aromatic hydrocarbon resins, may also be used. Aliphatic hydrocarbon resins particularly improve adhesion to other rubber components of the tyre. They generally have lower adhesion than the resins based on phenol and can be used either alone or as a mixture with resins based on phenol.

If the adhesion-enhancing resins are used at all, then preferably those selected from the group consisting of resins based on phenol, aromatic hydrocarbon resins and aliphatic hydrocarbon resins. Preferably, their proportion is 0 to 15 phr or 1 to 15 phr, particularly preferably 2 to 10 phr and more particularly preferably 3 to 8 phr.

Additives Promoting Vulcanisation

The rubber composition according to the invention may also contain additives that promote vulcanisation, but are unable to start it on their own. Such additives include, for example, vulcanisation accelerators such as saturated fatty acids with 12 to 24, preferably 14 to 20 and particularly preferably 16 to 18 carbon atoms, such as stearic acid and the zinc salts of the aforementioned fatty acids. Thiazoles may also belong to these additives. However, it is also possible to use vulcanisation-promoting additives only in the vulcanisation systems described below.

If vulcanisation-promoting additives and in particular the above-mentioned fatty acids and/or their zinc salts, preferably stearic acid and/or zinc stearate, are used in the rubber compositions according to the invention, their proportion is preferably 0 to 5 phr, particularly preferably 0.5 to 3 phr and particularly preferably 1 to 2 phr.

Preferably, the rubber composition according to the invention thus contains, in addition to the obligatory constituents, one or more constituents selected from the group consisting of i. rubbers that differ from halobutyl rubbers, ii. fillers F2 that differ from the fillers F1 to be used according to the invention, iii. softening agents, iv. adhesion-enhancing resins, and v. additives promoting vulcanisation, If one or more of the constituents mentioned under items i. to v. above are included, then i. preferably is a rubber selected from the group consisting of natural rubber, butyl rubber and styrene-butadiene rubber, ii. preferably is a filler F2 selected from the group of the carbon blacks and the phyllosilicates, iii. preferably is an ester of an aliphatic dicarboxylic acid, a paraffinic oil and/or a naphthenic oil, iv. is a resin selected from the group of aliphatic hydrocarbon resins, aromatic hydrocarbon resins, phenolic resins, phenol-formaldehyde resins and phenol-acetylene resins; and v. is an additive selected from the group of saturated fatty acids having 12 to 24 carbon atoms and of the thiazoles.

If the components i. to v. are included, then they are preferably included in the following amounts:

i. 0 to 30 phr, particularly preferably 0 to 20 phr, more particularly preferably 0 to 10 phr or 0 phr;

ii. 0 to 40 phr, particularly preferably 20 to 40 phr, more particularly preferably 25 to 35 phr;

iii. 0 to 15 phr, particularly preferably 5 to 15 phr, more particularly preferably 7 to 13 phr;

iv. 0 to 15 phr, particularly preferably 2 to 10 phr, more particularly preferably 3 to 8 phr; and v. 0 to 5 phr, particularly preferably 0.5 to 3 phr, more particularly preferably 1 to 2 phr.

Of the constituents listed in i. to v., particularly preferably only the constituents iii., iv. and v., or iii. and v. are present as further constituents, preferably in the above-mentioned particularly preferred and/or more particularly preferred amounts.

Vulcanisable Rubber Composition

The vulcanisable rubber compositions of the present invention comprise a rubber composition according to the invention and a vulcanisation system serving for its vulcanisation.

Vulcanisation Systems

The vulcanisation systems are not included herein among the rubber compositions of the invention, but are treated as additional systems that condition their crosslinking. By addition of the vulcanisation systems to the rubber compositions according to the invention, the vulcanisable rubber compositions also according to the invention are obtained.

The rubber compositions of the present invention based on halobutyl rubbers allow for the use of a wide variety of different vulcanisation systems. The chlorine-carbon bond that is weaker in comparison to a carbon-carbon bond, but especially the bromine-carbon bond, allows faster vulcanisation as well as better co-vulcanisation with general-purpose rubbers.

The vulcanisation of the rubber compositions of the present invention is preferably carried out using zinc oxide and/or sulfur.

In the preferred variants described hereinafter, zinc oxide is preferably used in combination with different organic compounds for vulcanisation. By means of the different additives, the vulcanisation behaviour as well as the properties of the vulcanised rubbers thus obtained may be influenced.

In a first variant of the zinc oxide-based vulcanisation, small amounts of a saturated fatty acid with 12 to 24, preferably 14 to 20 and particularly preferably 16 to 18 carbon atoms, for example stearic acid and/or zinc stearate, are preferably added to the zinc oxide as a vulcanisation accelerator. This allows to increase the vulcanisation rate.

Most often, however, the final grade of vulcanisation is reduced with the use of the fatty acids mentioned.

In a second variant of the zinc oxide-based vulcanisation, so-called thiurams such as thiuram monosulfide and thiuram disulfide and/or dithiocarbamates are added to the zinc oxide, in the absence of sulfur, in order to shorten the scorch time and to improve the vulcanisation efficiency by forming particularly stable networks.

In a third variant of the zinc oxide-based vulcanisation, an alkylphenol disulfide is added to the zinc oxide to adapt the scorch times, in particular to accelerate them.

Another, i.e., fourth, variant of the zinc oxide-based vulcanisation employs a combination of zinc oxide with polymethylolphenol resins and their halogenated derivatives, wherein neither sulfur nor sulfur-containing compounds are used.

In a further, fifth variant of the zinc oxide-based vulcanisation, the vulcanisation is carried out by means of a combination of zinc oxide with thiazoles and/or sulfenamides and preferably sulfur. The thiazoles and sulfenamides are preferably selected from the group consisting of 2-mercaptobenzothiazole (MBT), mercaptobenzothiazyl disulfide (MBTS), N-cyclohexyl-2-benzothiazyl sulfenamide (CBS), 2-morpholinothiobenzothiazole (MBS) and N-tert-butyl-2-benzothiazyl sulfenamide (TBBS). The addition of sulfur to such systems increases both the vulcanisation rate and the extent of vulcanisation and contributes to the workability of the rubber compositions during the vulcanisation process. The co-vulcanisation with rubbers that differ from the halobutyl rubbers, especially those mentioned above, is also favoured. The use of this vulcanisation system preferably provides heat- and fatigue-resistant vulcanised materials that exhibit good adhesion to other components of vehicle tyres, especially to rubber compositions of the carcass, even in the vulcanised state. A particularly advantageous vulcanisation system comprises zinc oxide, a thiazole such as preferably mercaptobenzothiazyl disulfide (MBTS), and sulfur. Particularly preferred is the combination of the first variant with the fifth variant, i. e., employing a vulcanisation system comprising zinc oxide, a thiazole such as preferably mercaptobenzothiazyl disulfide (MBTS), sulfur as well as stearic acid and/or optionally zinc stearate.

Less preferred vulcanisation systems are based on a pure sulfur vulcanisation or a peroxide vulcanisation, wherein the latter can lead to an undesirable reduction in molecular weights due to cleavage of the molecules, especially when butyl rubber or other rubbers are also used.

In the context of the present invention, the vulcanisation of the rubber composition according to the invention is carried out in the presence of the specific fillers F1, preferably the specific HTC lignins. The excellent properties of the vulcanised rubber composition according to the invention, in particular its suitability as an inner liner, are substantially based on the combination of the suitable rubber component with the specific fillers F1, in particular the preferred HTC lignins, and a zinc oxide-based vulcanisation system, preferably a vulcanisation system of the variant referred to above as the fifth variant, even more preferably the combination of the first variant with the fifth variant.

Components of the vulcanisation systems, which as such cannot initiate vulcanisation, may also be contained in the rubber composition of the present invention as "other constituents of the rubber composition". Thus, it is possible that in particular the stearic acid and/or optionally zinc stearate and/or the thiazole compound are already present in the rubber composition and the complete vulcanisation system is formed in situ by adding zinc oxide and sulfur.

Kit of Parts

Due to the relationship between the rubber compositions according to the invention and the crosslinking systems to be selected for their vulcanisation, the present invention also relates to a kit of parts comprising the rubber composition according to the invention and a vulcanisation system, preferably a zinc oxide and/or sulfur-based vulcanisation system. In the kit of parts, the rubber composition according to the invention and the vulcanisation system are spatially separated from one another and can thus be stored. The kit of parts serves for the preparation of the vulcanisable rubber composition. For example, the rubber composition according to the invention constituting one part of the kit of parts can be used as part (A) in step 1 of the method described below for preparing a vulcanisable rubber compound, and the second part of the kit of parts, i.e., the vulcanisation system, can be used as part (B) in step 2 of said method.

Preferably, the kit of parts comprises, as part (A), a rubber composition according to the present invention, and as part (B), a vulcanisation system comprising zinc oxide and/or sulfur.

Particularly preferably, the kit of parts comprises, as part (A), a rubber composition according to the present invention, and as part (B), a vulcanisation system comprising zinc oxide, sulfur and a thiazole; or as part (A), a rubber composition according to the present invention containing a thiazole, and as part (B), a vulcanisation system comprising zinc oxide and/or sulfur.

More particularly preferably, the kit of parts comprises, as part (A), a rubber composition according to the present invention, and as part (B), a vulcanisation system comprising zinc oxide, sulfur, a thiazole and stearic acid and optionally zinc stearate; or as part (A), a rubber composition according to the present invention, containing stearic acid and optionally zinc stearate, and as part (B), a vulcanisation system comprising zinc oxide, sulfur and a thiazole.

The preferred thiazole in the above kits of parts is MBTS.

In contrast to the vulcanisable rubber composition that already contains both the constituents of the rubber composition according to the invention and those of the associated vulcanisation system in a homogenous mixture, so that the vulcanisable rubber composition can be vulcanised directly, the rubber composition according to the invention and the vulcanisation system are spatially separated in the kit of parts.

The vulcanisable rubber composition obtainable from the kit of parts will herein also be referred to as "green compound". It can be obtained by the two-stage method described in the following section.

Method for Preparing the Rubber Composition according to the Invention and a Vulcanisable Rubber Composition Therefrom The preparation of the vulcanisable rubber compound is preferably carried out in two stages.

In the first stage, the rubber composition according to the invention is first prepared as a base compound (masterbatch) by compounding the constituents of the rubber composition. In the second stage, the constituents of the vulcanisation system are admixed.

Stage 1

Preferably, the halobutyl rubbers and any additional rubbers optionally used, as well as any adhesion-enhancing resin optionally used, are provided. However, the latter can also be added together with the other additives. Preferably, the rubbers have at least room temperature (23° C.) or are used after preheating to temperatures of not more than 50° C., preferably not more than 45° C., and particularly preferably not more than 40° C. Particularly preferably, the rubbers are pre-masticated for a short period of time before the other constituents are added. If inhibitors such as magnesium oxide are used for subsequent vulcanisation control, they are preferably also added at this point of time.

Subsequently, the fillers F1 to be used according to the invention, preferably as HTC lignins, and optionally other fillers are added, preferably with the exception of zinc oxide, since this is used as a constituent of the vulcanisation system in the rubber compositions according to the invention and is therefore herein not considered as a filler. The addition of the fillers F1 to be used according to the invention, preferably the HTC lignins and optionally other fillers, is preferably carried out incrementally.

Advantageously, but not necessarily, softening agents and other constituents such as stearic acid and/or zinc stearate are added only after the addition of the fillers F1 to be used according to the invention, preferably HTC lignins, or the other fillers, if used. This facilitates the incorporation of the fillers F1 to be used according to the invention, preferably HTC lignins and, if present, the other fillers. It may be advantageous, however, to incorporate a part of the fillers F1 to be used according to the invention, preferably HTC lignins or, if present, the other fillers, together with the softening agents and any other constituents optionally used.

The highest temperatures obtained during the preparation of the rubber composition in the first stage ("dump temperature") should not exceed 140° C., since there is a risk of partial decomposition of the reactive halobutyl rubbers above these temperatures. Preferably, the maximum temperature during the preparation of the rubber composition of the first stage is between 100° C. and 130° C., particularly preferably between 105° C. and 120° C.

The mixing of the constituents of the rubber composition according to the invention is usually carried out by means of internal mixers equipped with tangential or meshing (i.e., intermeshing) rotors. The latter usually allow for better temperature control. However, mixing can also be carried out using a double-roll mixer, for example.

After the preparation of the rubber composition, it is preferably cooled down before carrying out the second stage. A process of this type is also referred to as maturing. Typical maturing periods are 6 to 24 hours, preferably 12 to 24 hours.

Stage 2

In the second stage, the constituents of the vulcanisation system are incorporated into the rubber composition of the first stage, whereby a vulcanisable rubber composition according to the present invention is obtained.

If a zinc oxide-based vulcanisation system is used as the vulcanisation system, the zinc oxide and the other constituents such as sulfur in particular, and particularly preferably thiazole, are added in stage 2.

The highest temperatures obtained during the preparation of the admixture of the vulcanisation system to the rubber composition in the second stage ("dump temperature") should preferably not exceed 110° C., and particularly preferably not exceed 105° C. A preferred temperature range is between 90° C. and 110° C., particularly preferably 95° C.

and 105° C. At temperatures above 105 to 110° C., premature vulcanisation may occur.

After admixing the vulcanisation system in stage 2, the composition is preferably cooled down.

In the above-mentioned two-stage method, a rubber composition according to the invention is thus first obtained in the first stage, which is supplemented in the second stage to form a vulcanisable rubber composition, in particular a vulcanisable rubber composition for inner liners.

Method for Further Processing the Vulcanisable Rubber Composition According to the Invention The vulcanisable rubber compositions obtained in the two-stage method described above are preferably further processed by calendering, extrusion or in the roller head process.

Calendering

The vulcanisable rubber composition of the present invention is preferably fed to the calender in a first step (a), for example, using a preheating rolling mill and a downstream feeder rolling mill, or else in an extrusion process using an extruder. In both cases, the vulcanisable rubber composition should have a temperature of preferably 65° C. to 85° C., particularly preferably 70° C. to 80° C., before it is fed to the calender.

In the second step (b), calendering is carried out, wherein different roller positions of the preferably three or four rollers of the calender are possible. Preferably, calendering is carried out by means of a four-roll Z-type calender ("inclined Z calender") or a four-roll L-type calender ("inverted L calender"). Herein, the cooler pick-up rolls preferably have a temperature of 75° C. to 85° C., while the warmer rolls preferably have a temperature of 85° C. to 95° C.

After calendering the calendered vulcanisable rubber composition leaves the calender as a calendered web in a third step (c) and is cooled, preferably to temperatures below 35° C., before following processing. When the calendered webs leave the calender, it is also possible to consolidate several calendered webs into a multilayer. Care must be taken to ensure that no undesirable air inclusions occur during the consolidation process.

Following the three steps, it is advantageous to store the calendered webs or the calendered webs consolidated into a multilayer for at least 3 hours, even better for at least 4 hours, preferably for at least 12 to 24 hours, in a fourth step (d). This storage serves for the complete cooling of the calendered webs and allows stress relaxation.

Calendering is preferably carried out at calendering speeds in the range of 20 to 35 m/min, particularly preferably 25 to 30 m/min.

Extruding

Besides calendering, it is also possible to obtain inner liners by extrusion.

Feeding the vulcanisable rubber composition of the present invention to the extruder is preferably carried out in a first step (a), for example via a double-roll mixer or other suitable feeding devices. Here, the vulcanisable rubber composition should have a temperature of preferably 65° C. to 85° C., particularly preferably 70° C. to 80° C., before it is fed to the calender.

In the second step (b) of the extrusion, temperatures of 100° C. may be obtained. Therefore, special care must be taken to ensure that no scorching occurs.

After extrusion, the extruded vulcanisable rubber composition leaves the extruder as a web in a third step (c) and is cooled, preferably to temperatures below 35° C., before following processing. When the webs leave the extruder, multiple webs can also be consolidated into a multilayer. Care must be taken to ensure that no undesirable air inclusions occur during the consolidation process.

Following the three steps, it is advantageous to store the webs or the webs consolidated into a multilayer for at least 3 hours, even better for at least 4 hours, preferably for at least 12 to 24 hours, in a fourth step (d). This storage serves for the complete cooling of the webs and allows stress relaxation.

Roller Head Process

In the roller head process, the calender nip of a two- or three-roll calender is fed with a rubber compound from an extruder with a preform head, in contrast to calendering with multiple rollers, as described above. The extruder itself can be fed with warm or cold feedstock. For example, it is possible to use a cold-fed pin extruder. The roller nip (calender nip) can be optimally fed, when the provided compound is matched with the web to be calendered in terms of thickness and width, which can be achieved by the choice of the preform head and the exchangeable shaping dies mounted on its end.

In terms of operating behaviour, roller-head lines lie between extruders and calenders, wherein the uniform flow in the extruder die is decisive for the quality and dimension in the production of thicker webs, while calendering behaviour is more important for thinner webs.

The operating temperatures are in the range of calendering and extrusion as described above for these processes.

As already described in connection with calendering, the finished webs must be cooled after leaving the calender according to step (c) above, which is preferably followed by step (d) above.

The vulcanisable webs that were calendered, extruded or obtained by the roller head process have a layer thickness of 0.3 to 5 mm, particularly preferably 0.4 to 4 mm, more particularly preferably 0.5 to 3 mm. These layer thickness ranges are typical for inner liners.

Vulcanised Rubber Compositions

Also an object of the present invention are vulcanised rubber compositions which are obtainable from the vulcanisable rubber compositions described above, for example also by using a kit of parts.

The vulcanisation conditions depend on the vulcanisation system used. Suitable vulcanisation temperatures are preferably from 140° C. to 200° C., particularly preferably from 150° C. to 180° C.

Preferably, the vulcanised rubber composition is the inner liner of a pneumatic tyre.

Properties of the Vulcanised Rubber Composition

The vulcanised rubber compositions obtained from the vulcanisable rubber compositions according to the invention preferably have (a) a Shore A hardness in the range from more than 50 to less than 70, particularly preferably from 52 to 65 and more particularly preferably from 54 to 62; and/or (b) a modulus 300 of from 3.8 MPa to 10 MPa, particularly preferably from 4.5 MPa to 9 MPa, and more particularly preferably from 5.5 MPa to 8.5 MPa; and/or (c) a density of from 0.950 $g/cm^3$ to 1.120 $g/cm^3$, particularly preferably from 0.980 $g/cm^3$ to 1.110 $g/cm^3$ and more particularly preferably from 1.050 $g/cm^3$ to 1.100 $g/cm^3$; and/or (d) a gas permeability of less than $3.9 \times 10^{-17}$ $m^2/Pas$, particularly preferably a gas permeability of $3.0 \times 10^{-17}$ $m^2/Pas$ to $3.8 \times 10^{-17}$ $m^2/Pas$ and more particularly preferably of $3.2 \times 10^{-17}$ m²/Pas to $3.7 \times 10^{-17}$ m²/Pas, such as for example $3.2 \times 10^{-17}$ m²/Pas to $3.5 \times 10^{-17}$ m²/Pas.

In general, a higher content of fillers F1 that can be used according to the invention, in particular HTC lignins and optionally other fillers, typically reduces the gas permeability further, but at the expense of the tear strength and elongation at tear of the compound.

Method for Manufacturing a Pneumatic Tyre Comprising an Inner Liner Made of the Vulcanisable Rubber Composition According to the Invention The vulcanisable webs obtainable by the above methods are stored until use, preferably in the form of rolls, and serve as material for inner liners in the manufacture of pneumatic tyres. For this purpose, the webs must be cut to drum circumference, which is possible by using ultrasonic knives or heatable rotating circular knives, with the latter preferably in the so-called roll-on-and-cut process.

The inner liners are typically vulcanised under pressure and/or heat, together with the tyre carcass and/or the other tyre components.

Suitable vulcanisation temperatures are preferably from 140° C. to 200° C., particularly preferably from 150° C. to 180° C.

The process can be carried out, for example, in such a way that by closing the press, the tyre blank is moulded into the closing mould. For this purpose, an inner bellows (heating bellows) can be pressurised with a low pressure (<0.2 bar) so that the bellows also fits into the tyre blank. After that, the press and thus the mould are completely closed. The pressure in the bellows is increased (to shaping pressure, usually approx. 1.8 bar). Thereby, the profile is imprinted into the tread, as well as the sidewall labelling. In the next processing step, the press is locked and the clamping force is applied. The clamping force varies depending on the press type and the tyre size and may reach up to 2500 kN using hydraulic cylinders. After the closing forces have been applied, the actual vulcanisation process starts. Here, the mould is continuously heated with steam from the outside, wherein the temperatures are usually set between 150 and 180° C. For the inner medium, there are widely differing variants, depending on the tyre type. For example, steam or hot water is used inside the heating bellows. The internal pressures can vary and differ according to tyre types, such as passenger car or truck tyres.

All measured quantities mentioned in the present description in connection with the present invention are determined according to the procedures mentioned in the experimental part.

Use of the Fillers F1 to be used according to the Invention, in particular HTC Lignins Another object of the present application is the use of the fillers F1 as defined above in connection with the rubber composition according to the invention, preferably the HTC lignins, as fillers for the preparation of rubber compositions for inner liners, in particular inner liners for pneumatic tyres, in particular inner liners for pneumatic tyres for vehicles.

The invention is exemplified below with reference to several examples.

Examples

The constituents of the rubber composition, the non-vulcanised rubber composition and the vulcanised rubber composition were subjected to various test procedures, which will be described in more detail below.

Characterisation of Fillers (HTC Lignins or Carbon Blacks)

Mass-Related Surface (BET Surface and STSA Surface)

The specific surface area of the HTC lignin was determined by nitrogen adsorption according to the ASTM D 6556 (2019-01-01) standard provided for industrial carbon blacks. According to this standard, the BET surface area (specific total surface area according to Brunauer, Emmett and Teller) and the external surface area (STSA surface area; Statistical Thickness Surface Area) were determined as follows.

Prior to the measurement, the sample to be analysed was dried to a dry matter content 97.5 wt. % at 105° C. In addition, the measuring cell was dried in a drying oven at 105° C. for several hours before weighing in the sample. The sample was then filled into the measuring cell using a funnel. In case of contamination of the upper measuring cell shaft during filling, it was cleaned using a suitable brush or a pipe cleaner. In the case of strongly flying (electrostatic) material, glass wool was weighed in additionally into the sample. The glass wool was used to retain any material that might fly up during the bake-out process and contaminate the unit.

The sample to be analysed was baked out at 150° C. for 2 hours, and the $Al_2O_3$ standard was baked out at 350° C. for 1 hour.

The following N2 dosage was used for the determination, depending on the pressure range:

p/p0=0-0.01: $N_2$ dosage: 5 ml/g
p/p0=0.01-0.5: $N_2$ dosage: 4 ml/g

To determine the BET, extrapolation was performed in the range of p/p0=0.05-0.3 with at least 6 measurement points. To determine the STSA, extrapolation was performed in the range of the layer thickness of the adsorbed $N_2$ from t=0.4-0.63 nm (corresponding to p/p0=0.2-0.5) with at least 7 measurement points.

Determination of the Ash Content

The water-free ash content of the samples was determined as follows by thermogravimetric analysis in accordance with the DIN 51719 standard. Before weighing, the sample was ground or mortared. Prior to ash determination, the dry substance content of the weighed-in material is determined. The sample material was weighed to the nearest 0.1 mg in a crucible. The furnace, including the sample, was heated to a target temperature of 815° C. at a heating rate of 9° K/min and then held at this temperature for 2 h. The furnace was then cooled to 300° C. before the samples were taken out. The samples were cooled to ambient temperature in the desiccator and weighed again. The remaining ash was correlated to the initial weight and thus the weight percentage of ash was determined. Triplicate determinations were performed for each sample, and the averaged value was reported.

Determination of the pH Value

The pH was determined following ASTM D 1512 standard as described hereinafter. The dry sample, if not already in powder form, was mortared or ground to a powder. In each case, 5 g of sample and 50 g of fully de-ionised water were weighed into a glass beaker. The suspension was heated to a temperature of 60° C. with constant stirring using a magnetic stirrer with heating function and stirring flea, and the temperature was maintained at 60° C. for 30 min. Subsequently, the heating function of the stirrer was deactivated so that the mixture could cool down while stirring. After cooling, the evaporated water was replenished, by adding fully de-ionised water again and stirred again for 5 min. The pH value of the suspension was determined with a calibrated measuring instrument. The temperature of the suspension should be 23° C. (±0.5° C.). A duplicate determination was performed for each sample and the averaged value was reported.

Determination of Heat Loss

The heat loss of the sample was determined following ASTM D 1509 as described hereinafter. For this purpose, the MA100 moisture balance from the company Sartorius was heated to a dry temperature of 125° C. The dry sample, if not already in powder form, was mortared or ground to a powder. Approximately 2 g of the sample to be measured was weighed on a suitable aluminium pan in the moisture balance and then the measurement was started. As soon as the weight of the sample did not change by more than 1 mg for 30 s, this weight was considered constant and the measurement was terminated. The heating loss then corresponds to the displayed moisture content of the sample in wt. %. At least a duplicate determination was performed for each sample. The weighted mean values were reported.

Determination of Bulk Density

The bulk density of the sample was determined following ISO 697 as described hereinafter. A standard beaker according to DIN ISO 60 (100 ml volume) for the determination of the bulk density was placed into a dish that collects the overflow. The beaker was filled to overflow using a funnel and a shovel. The surplus was scraped off with a straight edge of the shovel along the bord of the beaker. The beaker was wiped on the outside with a dry cloth and then weighed with 0.1 g accuracy.

Determination of Acidic Hydroxyl Groups Available on the Surface (OH Group Density)

The determination of the acidic hydroxyl groups available on the surface was carried out qualitatively and quantitatively by colorimetry according to Sipponen. The method according to Sipponen is based on the adsorption of the alkaline dye Azure B to the acidic hydroxyl groups accessible on the filler surface, and is described in detail in the paper "Determination of surface-accessible acidic hydroxyls and surface area of lignin by cation dye adsorption" (Bioresource Technology 169 (2014) 80-87). The amount of surface-available acidic hydroxyl groups is given in mmol/g of filler. Regardless of how the filler was obtained, the process was applied not only to lignin-based fillers but also, for example, to the comparative carbon black N660.

Determination of the $^{14}$C Content

The determination of the $^{14}$C content (content of biologically based carbon) can be carried out by means of the radiocarbon method according to DIN EN 16640:2017-08.

Determination of Carbon Content

The carbon content can be determined by elementary analysis according to DIN 51732:2014-7.

Determination of Oxygen Content

The oxygen content can be determined by high-temperature pyrolysis using the EuroEA3000 CHNS-O Analyzer of the company EuroVector S.p.A.

Characterisation of the Vulcanisable Rubber Compositions ("Green Compounds")

Determination of Reaction Kinetics/Vulcanisation Kinetics

The reaction kinetics of non-vulcanised rubber compounds ("green compounds") were determined by means of a rheometer MDR 3000 Professional (MonTech Werkstoff-prüfmaschinen GmbH, Buchen, Germany) by determining the time course of the torque [dNm] according to DIN 53529 TI 3 (torsion shear rotorless curemeter). The upper and lower rotor plates of the rheometer were heated to 160° C. 5.5 g±0.5 g of the non-vulcanised rubber compositions were cut from the center of the sheet with scissors. Here, care was taken to ensure that the cut-out represented a square area and that the diagonal of this area corresponded to the diameter of the rotor of the rheometer. Before placing the non-vulcanised rubber composition on the rotor of the rheometer, the top and bottom of the cut-out were covered with a film. Immediately after inserting the non-vulcanised sample, the measurement was started.

The minimum and maximum torque ($M_L$, $M_H$) were determined from the measurement curves within a 30-minute test phase at 160° C. (0.5° arc, 1.67 Hz) and the difference $\Delta$ ($M_H$-$M_L$) was calculated therefrom.

Furthermore, for each of the measurement curves, the minimum torque $M_L$ was defined as 0% of the maximum torque $M_H$ and the maximum torque $M_H$ was normalised as 100%. Subsequently, the time periods were determined in which the torque, starting from the time of the minimum torque $M_L$, reaches 2%, 10%, 50% and 90% of the maximum torque $M_H$, respectively. The time periods were designated as $T_2$, $T_{10}$, $T_{50}$, and $T_{90}$.

Characterisation of the Vulcanised Rubber Compositions

Determination of Shore A Hardness

The determination of the Shore A hardness of vulcanised rubber compositions was carried out in accordance with ISO 7619-1, using a digital Shore hardness tester from the company Sauter GmbH. Before each measurement, the instrument was calibrated with the accompanying calibration plate. For the measurement of hardness, three S2 bars, which were punched out for performing the tensile test according to DIN 53504, were placed on top of each other. Hardness measurements were carried out at five different locations on the stack. The Shore A hardness of vulcanised rubber compositions represents the mean value of the five measurements. Between vulcanisation and testing, the sample was stored for at least 16 h at room temperature in the laboratory.

Determination of the Density of the Vulcanised Rubber Composition

The determination of the density of the vulcanised rubber compositions was carried out according to DIN EN ISO 1183-1: 2018-04 (Method for determining the density of non-cellular plastics) Method A (immersion method). Ethanol was used as the immersion medium. The density of the vulcanised rubber composition represents the mean value of a triple determination. Between vulcanisation and testing, the sample was stored for at least 16 h at room temperature in the laboratory.

Determination of Gas Permeability

The determination of the gas permeability of the vulcanised rubber composition to air was carried out according to ISO 15105. The measurements were carried out at 70° C. The gas permeability represents the mean value of three measurements. Between vulcanisation and testing, the sample was stored for at least 16 h at room temperature in the laboratory.

Determination of Tear Strength, Elongation at Tear and Stress Values (Moduli)

The tensile test is used to determine the tear strength, the elongation at tear and the stress values on non-preloaded specimens. In the tensile test, the specimens are stretched to the tear under constant strain rate and the force and change in length required for this are recorded.

Tear strength: The tear strength σR is the quotient of the force FR measured at the moment of tearing and the initial cross section A0 of the sample body.

Tensile strength: The tensile strength umax is the quotient of the measured maximum force Fmax and the initial cross section A0 of the sample body. For elastomers, the force FR occurring during tearing is generally also the maximum force Fmax.

Elongation at tear: The elongation at tear ER is the quotient of the change in length LR-L0 measured at the moment of tearing and the originally measured length L0 of the sample body. It is expressed as a percentage. For the sample bars used, L0 is the specified distance between two measuring marks.

Stress value: The stress value σi is the tensile force Fi present when a certain elongation is reached, related to the initial cross section A0. For sample bars, the strain is related to the originally measured length L0, i.e., the specified distance between the measuring marks.

The determination of tensile strength, elongation at tear and stress values of the vulcanised rubber composition was carried out in accordance with ISO 37 using a testing instrument of the Tensor Check type from the company Gibitre Instruments. Between vulcanisation and testing, the sample was stored for at least 16 h at room temperature in the laboratory. To determine the modulus, at least five dumbbell test samples were punched out of the vulcanised rubber composition with the specimen dimensions listed in ISO 37 (rod type S2). The thickness of the sample body was determined using a calibrated thickness gauge from the company Käfer Messuhren, and it represents the mean value of three measurements taken at different positions on the bridge portion. The crosshead speed during the tensile test was 200 mm/min. The stated measurement values given for tensile strength, elongation at break and stress values (moduli 100, 200, 300) are mean values from five measurements.

Examples for Preparation

Preparation of the HTC Lignins Usable according to the Invention

Two HTC lignins with different properties, in particular different BET and STSA surface areas and OH group densities, were prepared. The HTC lignins A and B were prepared analogously to the HCT lignins described in WO 2017/085278.

Both HTC lignins A and B could be characterised as indicated in Table 1. The results of the characterisation were compared with the commercially available and ASTM standardised industrial carbon black type N660 (available from the company Lehmann and Voss).

TABLE 1

| Test | Unit | HTC lignin A | HTC lignin B | Carbon black N660 |
|---|---|---|---|---|
| STSA | m²/g | 22 | 40 | 35 |
| BET | m²/g | 23 | 39 | 34 |
| Ash content | wt. % | 3.8 | 3.1 | 0.30 |
| pH value | ./. | 8.1 | 7.9 | 9.1 |
| Heat loss | wt. % | 1.5 | 2.4 | 0.7 |
| Density | g/cm³ | 1.35 | 1.35 | 1.82 |
| ¹⁴C content | Bq/g C | 0.244 | 0.243 | ≤0.05 |
| Carbon content | wt. % | 71 | 71 | >98 |
| Oxygen content | wt. % | 22 | 22 | <0.5 |
| Density of OH groups[1] | mmol/g | 0.3 | 0.34 | 0 |

[1] = Acidic hydroxyl groups available on the surface

Preparation of Different Rubber Compositions (Stage 1)

In a Haake Rheomix 3000 S mixer, equipped with Banbury rotors, from the company ThermoFischer, rubber compositions (base compounds; masterbatches) were prepared as follows, with the constituents and amounts given in Table 2.

Before mixing started, the mixing chamber was heated to 40° C. The amounts of the constituents were calculated in each case to give a mixing chamber filling level of 70%. All constituents were pre-weighed on a scale from the company Kern. After starting the rotors (50 rpm), the mixing chamber was charged with rubber, the filling device leading to the mixing chamber was pneumatically locked, and mixing was carried out to a total mixing time of 1 minute. After that, the filling device of the mixing chamber was opened, ⅓ of the filler amount was added, the mixing chamber was closed again and mixing was carried out up to a total mixing time of 2 minutes. The filler of the mixing chamber was then opened, ⅙ of the filler amount, followed by ½ of the oil amount, followed by ⅙ of the filler amount was added, the mixing chamber was closed again and mixing was carried out up to a total mixing time of 4 minutes. Then, the filling device of the mixing chamber was opened, ⅙ of the filler amount, followed by ½ of the oil amount, followed by ⅙ of the filler amount and additives were added, the mixing chamber was closed again, and mixing was carried out up to a total mixing time of 6 minutes. The chamber was aerated after 6 and 8 minutes of total mixing time, respectively. The ejection temperature was controlled by regulating the speed. Ejection occurred after a total mixing time of 10 minutes, and the temperature of the compound was measured.

After the mixing process, the compound was taken from the mixer and cooled and homogenised on a laboratory rolling mill at medium nip width. For this purpose, the compound was first passed through the roller nip once, the resulting compound sheet was rolled into a "doll" and plunged overhead through the roller nip six times. The sheet was then placed on the cooling table to cool until the sheet had reached room temperature.

TABLE 2

| | EXAMPLES [amounts in phr] | | | | |
|---|---|---|---|---|---|
| Constituents | V1 | B1 | B2 | B3 | B4 |
| BIIR 2230[1] | 100 | 100 | 100 | 100 | 100 |
| Carbon black N660[2] | 70 | — | — | — | — |
| HTC lignin A | — | 54 | 70 | — | — |
| HTC lignin B | — | — | — | 54 | 70 |
| Paraffin oil[3] | 10 | 10 | 10 | 10 | 10 |
| Stearic acid | 1.5 | 1.5 | 1.5 | 1.5 | 1.5 |
| Total amount | 181.5 | 165.5 | 181.5 | 165.5 | 181.5 |
| $T_{max}$[4] [in ° C.] | 109 | 104 | 112 | 107 | 117 |

[1]Bromobutyl rubber X Butyl BB 2230 from the company Arlanxeo
[2]Carbon black N660 from Lehmann und Voss
[3]Paraffin oil from the company Hansen und Rosenthal
[4]Highest temperature reached during mixing ("dumping temperature")

Comparative Example V1 differs from Examples B1 to B4 according to the invention in that industrial carbon black N660 was used in this example. In Examples B1 and B3 according to the invention, amounts of the HTC lignins equivalent in terms of volume were used with respect to carbon black N660. In Examples B2 and B4, amounts of the HTC lignins equivalent in terms of weight were used with respect to carbon black N660.

Preparation of Vulcanisable Rubber Compositions (Stage 2)

The vulcanisable "green compounds" of Examples B1 to B4 according to the invention were prepared for each of the rubber compositions by admixing a vulcanisation system consisting of 5 phr zinc oxide, 1.5 phr sulfur and 1.25 phr mercaptobenzothiazyl disulfide (MBTS) (phr=parts by weight based on 100 parts by weight of the rubber mass). In Comparative Example V1, the zinc oxide was already added in step 1.

First, the cooled compound sheet was cut into strips and the vulcanisation chemicals were weighed out. After starting the rotors (50 rpm) at 40° C. mixing chamber temperature, the sheet was fed to the mixing chamber, the filling device to the mixing chamber was pneumatically locked and mixing was carried out up to a total mixing time of 2 minutes. Subsequently, the filling device to the mixing chamber was opened, vulcanisation chemicals were added, the filling device to the mixing chamber was pneumatically locked, and mixing was performed up to a total mixing time of 5 minutes. The ejection temperature was controlled by regulating the speed. Ejection occurred after a total mixing time of 5 minutes, and the temperature of the compound was measured.

After the mixing process, the compound was taken from the mixer and cooled and homogenised on a laboratory rolling mill at medium nip width. For this purpose, the mixture was first passed through the roller nip once, the resulting compound sheet was rolled into a "doll" and plunged overhead through the roller nip six times. The sheet was then placed on the cooling table to cool until the sheet had reached room temperature.

From this resulted the vulcanisable compositions $V1_g$ and $B1_g$ to $B4_g$, wherein "g" stands for "Green Compound" and the remaining designation corresponds to Examples V1 and B1 to B4.

Preparation of the Vulcanised Rubber Compositions

From the vulcanisable rubber compositions $V1_g$ and $B1_g$ to $B4_g$, completely vulcanised test samples $V1_v$ and $B1_v$ to $B4_v$, corresponding to the vulcanisable green compounds $V1_g$ and $B1_g$ to $B4_g$, were obtained by vulcanisation at 160°

C. in vulcanising presses. The compound sheet was rolled out without wrinkles to a thickness of 3 mm, by successively reducing the nip width of the laboratory roller. A square with dimensions of 250×250 mm was then cut from this sheet with scissors and transferred to the press (Gibitre Instruments S.R.L. vulcanisation press, with built-in mould for test plates of 2 mm thickness). The vulcanisation time to be set results from the t90 time determined in the rheometer test plus one minute per millimeter of sheet thickness (i.e., plus two when using the 2 mm frame). The vulcanised rubber mat was removed immediately after the pressing time had elapsed. The mat was placed on the cooling table for cooling. After cooling, the protruding edge was carefully cut off with scissors.

Test Results

In Table 3, the test results with regard to the reaction kinetics/vulcanisation kinetics of the vulcanisable rubber compositions $V1_g$ and $B1_g$ to $B4_g$ are reported.

TABLE 3

| Measured variable | Unit | $V1_g$ | $B1_g$ | $B2_g$ | $B3_g$ | $B4_g$ |
|---|---|---|---|---|---|---|
| $M_L$ | dNm | 2.0 | 1.7 | 2.2 | 2.0 | 2.7 |
| $M_H$ | dNm | 9.8 | 7.1 | 9.9 | 8.6 | 11.3 |
| $\Delta(M_H - M_L)$ | dNm | 7.8 | 5.5 | 7.7 | 6.6 | 8.6 |
| $T_2$ | min | 0.8 | 1.1 | 1.1 | 1.1 | 1.1 |
| $T_{10}$ | min | 2.00 | 3.26 | 2.95 | 2.68 | 2.49 |
| $T_{50}$ | min | 4.11 | 12.35 | 11.30 | 12.0 | 12.2 |
| $T_{90}$ | min | 14.3 | 24.1 | 23.0 | 25.1 | 25.4 |

As can be seen from Table 3, scorching is delayed for compounds $B1_g$ to $B4_g$, which leads to an improved processability. The complete vulcanisation time is significantly prolonged. This is not a disadvantage when it is used in the inner liner, since this component is in direct contact with the temperature emitted by the heating bellows, and thus complete vulcanisation is given. There is, however, the possibility to regulate the reaction kinetics to be correspondingly faster by using zinc stearate (1 to 2 phr). However, the zinc oxide dosage must then be adjusted.

Table 4 shows the measured values obtained on the vulcanised test sample bodies.

TABLE 4

| Measured variable | Unit | $V1_v$ | $B1_v$ | $B2_v$ | $B3_v$ | $B4_v$ |
|---|---|---|---|---|---|---|
| Shore A hardness | | 61 | 54 | 55 | 55 | 62 |
| Density | $g/cm^3$ | 1.183 | 1.070 | 1.088 | 1.072 | 1.089 |
| Gas permeability | $10^{-17}$ $m^2/Pas$ | 3.89 | 3.62 | 3.31 | 3.89 | 3.46 |
| Modulus 100 | MPa | 1.9 | 1.0 | 1.7 | 1.2 | 2.7 |
| Modulus 200 | MPa | 4.6 | 2.2 | 3.9 | 2.9 | 5.8 |
| Modulus 300 | MPa | 7.6 | 3.9 | 5.8 | 4.9 | 8.3 |
| Modulus 300/ Modulus 100 | — | 4.0 | 4.1 | 3.5 | 4.0 | 3.1 |
| Tensile strength | MPa | 12.0 | 6.6 | 6.3 | 8.5 | 8.6 |
| Elongation at failure | % | 494 | 510 | 352 | 486 | 323 |

As can be seen from Table 4, a good level of the values for the physical characteristics can be achieved when using HTC lignin. The reinforcement properties show a reinforcement index which, depending on the degree of filling (same weight dosage or same volume dosage) is at the level of the reference compound. The moduli can be adjusted depending on the BET surface area and dosage, so that various physical properties can be specifically optimised. Regardless of these adjustments, the density of the $B1_v$-$B4_v$ compounds is significantly lower. As soon as the dosage of HTC lignin is greater than "iso-volumetric", gas permeation is also improved. It is therefore possible with HTC lignin to adjust low density, low permeation, high elongation at break and good crack resistance. Here, Example $B1_v$ (HTC lignin with BET=20 $m^2/g$) shows a combination of low density, high elongation at break, and reduced gas permeability.

The invention claimed is:

1. A rubber composition comprising:
a rubber component, which comprises at least one halobutyl rubber selected from the group consisting of bromobutyl rubber and chlorobutyl rubber; and
a filler component which comprises at least one filler F1 that has:
a $^{14}C$ content in a range of 0.20 to 0.45 Bq/g of carbon;
a carbon content in a range of 60 wt. % to 85 wt. % relative to ash-free and water-free filler;
an oxygen content in a range of 15 wt. % to 30 wt. % relative to ash-free and water-free filler;
a statistical thickness surface area (STSA) in a range of 10 $m^2/g$ of the filler F1 to 50 $m^2/g$ of the filler F1; and
acidic hydroxyl groups on a surface of the filler F1, the acidic hydroxyl groups available on the surface according to Sipponen in a range of 0.05 mmol/g to 40 mmol/g;
wherein a proportion of the halobutyl rubber in the rubber composition is 70 to 100 phr.

2. The rubber composition according to claim 1, wherein the filler component comprises 50 to 90 phr of the filler F1.

3. The rubber composition according to claim 1, comprising one or more further constituents selected from the group consisting of:
(i) rubbers that differ from the halobutyl rubbers,
(ii) fillers F2 that differ from the filler F1,
(iii) softening agents,
(iv) adhesion-enhancing resins, and
(v) additives promoting vulcanization.

4. The rubber composition according to claim 3, wherein:
(i) the rubbers that differ from the halobutyl rubbers are selected from the group consisting of: natural rubber, butyl rubber and styrene-butadiene rubber, and/or (ii) the fillers F2 that differ from the filler F1 are selected from the group consisting of: carbon blacks and phyllosilicates, and/or
(iii) the softening agents are selected from the group consisting of: esters of aliphatic dicarboxylic acids, paraffinic oils, and naphthenic oils, and/or
(iv) the adhesion-enhancing resins are selected from the group consisting of: aliphatic hydrocarbon resins, aromatic hydrocarbon resins, phenolic resins, phenol formaldehyde resins, and phenol acetylene resins; and/or
(v) the additives promoting vulcanization are selected from the group consisting of: saturated fatty acids with 12 to 24 carbon atoms and thiazoles.

5. The rubber composition according to claim 3, wherein:
(i) a proportion of the rubbers that differ from the halobutyl rubbers in the rubber composition is 0 to 30 phr, and/or
(ii) a proportion of the fillers F2 that differ from the filler F1 in the rubber composition is 0 to 40 phr, and/or
(iii) a proportion of the softening agents in the rubber composition is 0 to 15 phr, and/or
(iv) a proportion of the adhesion-enhancing resins in the rubber composition is 0 to 15 phr; and/or
(v) a proportion of the additives promoting vulcanization in the rubber composition is 0 to 5 phr.

6. The rubber composition according to claim 1, wherein the filler F1 is a lignin-based filler.

7. The rubber composition according to claim 1, wherein the filler F1 is a hydrothermally carbonised lignin.

8. A vulcanisable rubber composition comprising a rubber composition according to claim 1, and a vulcanization system comprising zinc oxide and/or sulfur.

9. The vulcanisable rubber composition according to claim 8, wherein the vulcanization system comprises the zinc oxide, and one of the following:
(a) at least one saturated fatty acid having 12 to 24 carbon atoms;
(b) at least one thiuram and/or dithiocarbamate, and preferably no sulfur;
(c) at least one alkyl phenoldisulfide;
(d) at least polymethylolphenol resin or a halogenated polymethylolphenol resin, and preferably no sulfur and no sulfur-containing compounds;
(e) sulfur and at least one thiazole and/or sulfenamide; or
(f) sulfur, at least one thiazole and/or sulfenamide, and at least one saturated fatty acid having 12 to 24 carbon atoms.

10. A kit of parts comprising, in spatially separated form, a rubber composition (A) according to claim 1, and a vulcanization system (B) comprising zinc oxide and/or sulfur.

11. A method for preparing a rubber composition comprising: mixing a rubber component comprising at least one halobutyl rubber selected from the group consisting of bromobutyl rubber and chlorobutyl rubber; and a filler component comprising at least one filler F1 that has: a $^{14}C$ content in a range of 0.20 to 0.45 Bq/g of carbon, a carbon content in a range of 60 wt. % to 85 wt. % relative to ash-free and water-free filler, an oxygen content in a range of 15 wt. % to 30 wt. % relative to the ash-free and water-free filler; a statistical thickness surface area (STSA) in a range of 10 $m^2/g$ of the filler F1 to 50 $m^2/g$ of the filler F1, and acidic hydroxyl groups on a surface of the filler F1, the acidic hydroxyl groups available on the surface according to Sipponen in a range of 0.05 mmol/g to 40 mmol/g, wherein a proportion of the halobutyl rubber in the rubber composition is 70 to 100 phr; and optionally further incorporation one or more softening agents, adhesion-enhancing resins, and additives promoting vulcanization therein.

12. A method for preparing a vulcanisable rubber composition comprising: performing, in a first stage, according to the method of claim 11 to prepare the rubber composition, and subsequently, in a second stage, admixing a vulcanization system comprising zinc oxide and/or sulfur with the rubber composition to prepare the vulcanisable rubber composition.

13. The method according to claim 12 further comprising: forming the vulcanisable rubber composition into a web by calendering, extrusion, or in a roller head process.

14. The method according to claim 13, wherein the web has a thickness in the range of 0.3 to 5 mm.

15. The method of claim 13 further comprising: preparing an inner liner of a pneumatic tyre by cutting to size the web, and subsequently vulcanising the inner liner together with a carcass of a pneumatic tyre.

16. The method of claim 11, wherein the rubber composition is suitable for an inner liner of a pneumatic tyre, and wherein the filler F1 is defined by one or more of the following: the filler F1 is a lignin-based filler; the filler F1 is a hydrothermally carbonised lignin.

17. A vulcanised rubber composition, obtained by vulcanising the vulcanisable rubber composition according to claim 8.

18. The vulcanised rubber composition according to claim 17 comprising:

(a) a Shore A hardness according to ISO 7619-1 in the range of more than 50 to less than 70, and/or (b) a modulus 300 according to ISO 37 of 3.8 MPa to 10 MPa; and/or (c) a density at 23° C. according to DIN EN ISO 1183-1:2018-04 of 0.950 g/cm$^3$ to 1.120 g/cm$^3$; and/or (d) a gas permeability at 70° C. for air according to ISO 15105 of less than $3.9 \times 10^{-17}$ m$^2$/Pas.

19. The vulcanised rubber composition according to claim 17, wherein it is an inner liner of a pneumatic tyre.

* * * * *